Sept. 17, 1963   W. T. HARRIS   3,104,336
HOLLOW CONICAL ELECTROMECHANICAL TRANSDUCER FOR USE IN AIR
Original Filed April 14, 1958
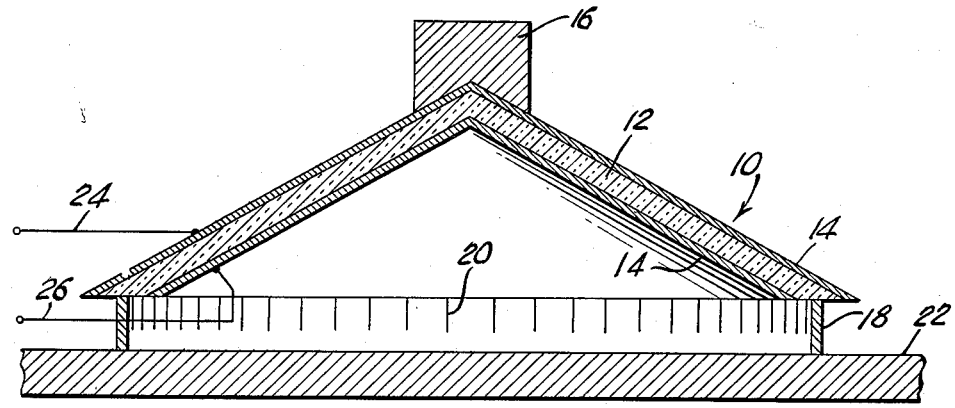
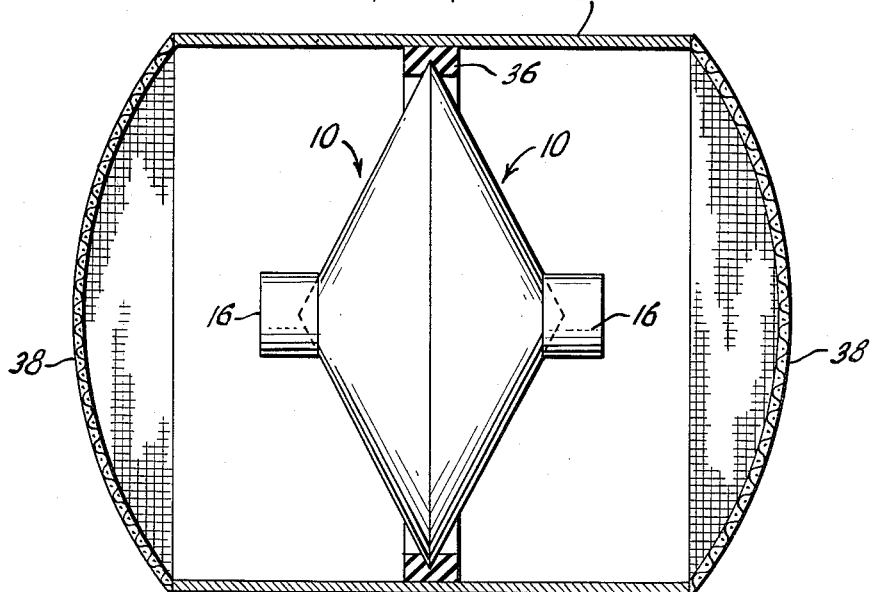
INVENTOR.
WILBUR T. HARRIS.
BY
ATTORNEY United States Patent Office 3,104,336
Patented Sept. 17, 1963

3,104,336
HOLLOW CONICAL ELECTROMECHANICAL
TRANSDUCER FOR USE IN AIR
Wilbur T. Harris, R.F.D. 3, Southbury, Conn.
Original application Apr. 14, 1958, Ser. No. 728,497, now Patent No. 3,030,606, dated Apr. 17, 1962. Divided and this application Jan 3, 1962, Ser. No. 174,639
11 Claims. (Cl. 310—8.8)
(Granted under Title 35, U.S. Code (1952), sec. 266)

The invention described herein may be manufactured and used by or for the Government of the United States of America for governmental purposes without the payment of any royalties thereon or therefor.

This invention relates to improved electromechanical transducers that have utility in generating and intercepting compressional wave energy in gaseous mediums such as air. This application is a division of my application Serial Number 728,497, filed April 14, 1958, for Conical Electromechanical Transducer, which has matured into Patent No. 3,030,606, granted April 17, 1962; the latter is a continuation-in-part of my application Serial Number 343,531, filed March 19, 1953, for Transducer, now Patent Number 2,834,952.

Heretofore, many electromechanical transducer elements of magnetostrictive material and electric coils were made in the form of wound cylinders, rods, and laminated rings. Many other electromechanical transducer elements were in the form of cylinders or blocks comprising electrode coated materials of the type wherein mechanical strain is accompanied by corresponding voltage change between opposing electrodes and wherein change in voltage applied between the opposing electrodes is accompanied by corresponding mechanical strain in the coated materials. The mechanical and electrical considerations that have dominated previous transducer element designs have resulted in transducer elements that are not efficient, nor broadband, nor of light weight, nor small and compact.

An object of this invention is to provide an electromechanical transducer for use in a compressional wave transmitting medium such as air and that is more efficient, lighter in weight, smaller and more compact, and that is easier to fabricate and whose cost of material is less than for transducers available heretofore for corresponding service.

Another object is to provide a broadband electromechanical transducer in accordance with the aforementioned object.

Another object is to provide a broadband electromechanical transducer in accordance with the first-mentioned object.

Another object is to provide an audio frequency range electromechanical transducer in accordance with any one or more of the preceding objects and which is of exceptionally small size compared to transducers available heretofore for the same service.

A further object is to provide an acceleration and displacement sensitive transducer.

Other objects and many of the attendant advantages of this invention will be readily appreciated as the same becomes better understood by reference to the following detailed description when considered in connection with the accompanying drawings wherein:

FIG. 1 illustrates an embodiment of this invention that is particularly adapted for use in air;

FIG. 2 illustrates another embodiment including two hollow transducer elements corresponding to the one shown in FIG. 1 bonded base to base for use in air.

The disclosed embodiments of this invention include at least one conical sensitive element 10 which is comprised of a hollow, substantially rigid, nonconductive cone 12 having inner and outer conical surfaces each of which are coated with a thin conductive film 14. The conductive films on the inner and outer surfaces are spaced apart at the base of the cone. The wall thickness of each cone 12 is substantially uniform. The material of which the cone 12 is made is of the type wherein mechanical strain in the altitude and circumferential dimensions of the cone 12 is accompanied by corresponding voltage change between the conductive films 14. Compressional waves in the medium surrounding the cone can produce such mechanical strain in the cone. Conversely, change in voltage applied between the conductive films 14 on the inner and outer faces of cone 12 is accompanied by mechanical strain in the altitude and circumferential dimensions of the cone tending to set up compressional waves in the surrounding medium. An electrostrictive material such as barium titanate, properly polarized, is suitable for this invention. Barium titanate as an electrostrictive material is described in substantial detail in U.S. Patent Number 2,486,560.

A weight 16 of a very rigid material that is substantially more dense than the cone material is secured to the apex portion of the cone coaxial with the cone and proximate with the apex of the cone. The weight 16 may be bonded to the outside of the cone as in the drawings, or it may be bonded to the inside of the cone, or it may include a stem which pierces the apex and is bonded therein. The weight is of a material that is substantially noncorrosive in the medium in which the transducer is used; e.g., the weight may be of stainless steel, brass, bronze. Relatively, soft materials such as lead are not desirable for weight 16 because they deform too readily under the conditions of use.

The conical sensitive element 10 described above has a broadband character. This is best appreciated by imagining the cone as made up of a graded series of stacked rings transverse to the axis of the cone, one above the other. Each of the rings is resonant at a different frequency. The largest diameter ring has the lowest resonant frequency and the smallest diameter ring has the highest resonant frequency. At all frequencies between the above limits there is a ring portion of the cone that is resonant. The weight 16, secured to the apex of the cone, lowers and narrows the resonant frequency band of the cone 10. The efficiency of the weighted cone in its relatively narrow band is substantially higher than the efficiency of the unweighted cone in the same band. The efficiency of both the weighted cone and the unweighted cone is exceptionally high not only for the preceding reasons but also because mechanical impedance of the cone can be matched to the compressional wave medium wherein it is to be used by proper selection of wall thickness, cone angle and overall size. In a broadband cone-shaped transducer, sensitivity and mechanical impedance exhibit the following relationship with the cone parameters:

|  | Sensitivity | Mechanical Impedance |
| --- | --- | --- |
| Increased wall Thickness | Decreased | Increased. |
| Steeper Cone | do | Do. |
| Increased Overall Cone Size | Increased | Decreased. |

In the narrow band cone-shaped transducer, sensitivity, frequency, mechanical Q, and mechanical impedance exhibit the following relationships with cone parameters:

|  | Sensitivity | Frequency | Mechanical Q | Mechanical Impedance |
|---|---|---|---|---|
| Increased Wall Thickness. | Increased. | Increased. | Increased. | Increased. |
| Steeper Cone. | Decreased. | ----do---- | ----do---- | Do. |
| Increased Overall Cone Size. | Increased. | Decreased. | Dreceased. | Decreased. |

The cones in this invention possess useful sensitivity at frequencies which are lower than their lowest resonant frequencies, though the sensitivity is substantially lower than within the resonant frequency limits.

In the modification shown in FIG. 1, for use in air, the altitude of cone 10 is exaggerated for illustration purposes; an air transducer is shallower than shown. The conductive films 14 are free of any covering being in direct contact with the air so that mechanical energy incident to the cone is not attenuated thereby and cone vibration is not damped thereby. Cone 10 is bonded to a ring 18 of a rigid resilient material having a series of substantially equally spaced slits 20 that are parallel to the axis of the ring and extend from that open end of the ring which is bonded to the base of the cone toward, but not to, the other open end of the ring. The other open end of ring 18 is bonded to a rigid plate 22. Leads 24 and 26 are electrically connected to the outside and inside conductive films respectively. The leads 24 and 26 are short and light-weight so as not to mechanically load the transducer, terminating at a support, not shown, adjacent to the transducer and electrically connected to an electric cable at that support, as is conventional. The ring 18 prevents the cone from tilting relative thereto, opposes axial movement of the base of the cone relative thereto, and readily permits circumferential strain or radial movement of the base of the cone. The ring 18 opposes axial movement of the base of the cone relative thereto to a far greater degree than circumferential strain at the base of the cone. The air within the space defined by the cone 12, the ring 18, and the plate 22 is sufficiently isolated from the outside air that there is only a small percentage transfer of compressional wave energy from the air outside the transducer to the air inside the transducer and from the air inside the transducer to the air outside the transducer. This transducer is exceptionally efficient because its mechanical impedance is matched to the air and because of its superior resonance characteristic both with and without weight 16. The mounting ring 18 while serving as an excellent support for the cone offers little impedance to radial motion of the base of the cone and hence exercises minor damping or loading effect on the cone.

In the embodiment shown in FIG. 2, instead of ring 18 and plate 20 as in FIG. 1, one cone is supported by another sensitive cone 10; the two cones are substantially identical dimensionally and well matched in mechanical properties. The two cones are bonded together by an epoxy resin or other suitable material base-to-base and substantially coaxially so that the structure is symmetrical. The chamber defined therebetween is sealed in. Whether the conductive films of the respective cones are connected in parallel or series is a matter of design depending upon service requirements. The cones are polarized in accordance with the circuit connections desired. The difference in results obtained with the respective circuit connections is analogous to the differences in results obtained from series and parallel connected batteries.

A double cone transducer has very desirable properties. First, each cone 10 serves as a mechanical support having ideal mechanical properties for the purpose and serves as a sealing member for the other cone. Since mechanical vibration in one cone is accompanied by mechanical vibration in the mating cone, there is substantially no impedance to radial movement at the bases of the cones. Second, no pressure release material is needed for the inside surface. Third, the symmetry of the structure renders it omnidirectional. Fourth, the double cone construction generally offers the possibility of achieving double sensitivity as compared to a single cone structure. Fifth, the mechanics of the double cone lead to well defined low frequency resonance which is especially advantageous because transducers in accordance herewith which are small and light weight may be used for low frequency applications.

In FIG. 2, the double cone is mounted in a rigid cylinder 34 by means of a flexible rubber annulus 36. The ends of the cylinder 34 are covered by screens 38 that is substantially transparent to compressional wave energy, which mechanically protect the cones 12 and which do not interfere with vibration of the cones. The cylinder 34 renders the transducer somewhat directional. This combination has utility as an air microphone.

This invention, in all its embodiments, is exceptionally efficient and is relatively small and compact compared to transducers available heretofore.

Obviously many modifications and variations of the present invention are possible in the light of the above teachings. It is therefore to be understood that within the scope of the appended claims the invention may be practiced otherwise than as specifically described.

I claim:

1. An improved electromechanical transducer comprising: a hollow substantially rigid nonconductive cone having inner and outer conical surfaces which are each coated with thin conductive films spaced apart at the base of said cone, the inwardly directed surface of the conductive film on the inner conical surface and the outwardly directed surface of the film on the outer conical surface being free of covering and the volume defined by the inner surface of the inner conical film being substantially free of solid matter, said cone being of a material of the type wherein strain in the altitude and circumferential dimensions of the cone is accompanied by corresponding voltage change between said conductive films and wherein change in voltage applied between said conductive films is accompanied by strain in the altitude and circumferential dimensions of said cone tending to set up compressional waves in the surrounding medium, a compact weight member whose density is greater than that of the cone material secured to and proximal with the apex of said cone, and means secured to the base of said cone for opposing lateral tilting of said cone relative thereto and for opposing axial movement of the base of said cone relative thereto a substantially greater degree than circumferential and radial strain at the base of said cone when compressional wave energy is intercepted by said cone or when electrical energy is applied to said cone by way of said conductive coatings.

2. An improved electromechanical transducer as defined in claim 1 wherein said cone material is polarized electrostrictive material.

3. An improved electromechanical transducer as defined in claim 1 wherein said means secured to the base of said cone comprises a cone and conductive films and weight member substantially identical to the first recited combination of said cone, conductive films and weight member, said cones being secured and sealed base-to-base in axial alignment defining a sealed-in chamber therebetween.

4. An improved electromechanical transducer as defined in claim 3 for use in air further including a rigid cylindrical support member, an annulus of elastic rubber, the outside perimeter of said annulus being secured to the inside surface of said support member and the inside perimeter of said annulus being secured to the outside perimeters of the bases of said cones, a screen substantially transparent to compressional waves terminating each end of said cylindrical member and spaced from said cones and said weights for affording mechanical protection to said transducer.

5. An improved electromechanical transducer for use in air comprising: a hollow substantially rigid nonconductive cone having inner and outer conical surfaces, conductive films contacting and covering said inner and outer surfaces respectively and spaced apart at the base of said cone, said cone being of a material of the type wherein strain in the altitude and circumferential dimensions of the cone is accompanied by corresponding voltage change between said conductive films and wherein changes in voltage applied between said conductive films is accompanied by corresponding strain in the altitude and circumferential dimensions of said cone tending to set up compressional waves in the surrounding medium, said conductive films being free of any covering which can substantially damp mechanical energy and the volume defined by the inner surface of the inner conical film being substantially free of solid matter, and means secured to the base of said cone for opposing lateral tilting of said cone relative thereto and axial movement of the base of said cone relative thereto to a substantially greater degree than circumferential and radial strain at the base of said cone when compressional wave energy is intercepted by said cone or when electrical energy is applied to said cone by way of said conductive films.

6. An improved electromechanical transducer as defined in claim 5 wherein said means comprises a cone and conductive films substantially identical to the first-recited combination of said cone and said conductive films, said cones being secured and sealed base-to-base in axial alignment defining a sealed-in chamber therebetween.

7. An improved electromechanical transducer as defined in claim 6 further including a rigid cylindrical support member, an annulus of resilient rubber the outside perimeter of said annulus being secured to the inside surface of said support member and the inside perimeter of said annulus being secured to the outside perimeters of the bases of said cones, a screen substantially transparent to compressional waves terminating each end of said cylindrical member and spaced from said cones for affording mechanical protection to said cones.

8. An electromechanical transducer comprising in combination a pair of hollow substantially rigid nonconductive cones having inner and outer conical surfaces which are each coated with thin conductive films spaced apart at the base of said cones, each of said cones being of a material of the type wherein strain in the altitude and circumferential dimensions of the cone is accompanied by voltage change between said conductive films on its inner and outer surface and wherein change in voltage applied between said conductive films on its inner and outer surfaces is accompanied by strain in the altitude and circumferential dimensions of said cone tending to set up compressional waves in the surrounding medium, a compact weight member whose density is greater than that of the cone material for each of the cones and secured to and proximal with the apices of the respective cones, said cones being secured and sealed base-to-base in axial alignment and defining a sealed-in chamber therebetween, whereby each of said cones opposes lateral tilting of the other cone relative thereto and opposes axial movement of the base of the other cone relative thereto to a substantially greater degree than circumferential and radial strain at the base of the other cone when compressional wave energy is intercepted by said other cone or when electrical energy is applied, said inner conductive films being electrically connected in common, said outer conductive films being electrically connected in common, separate electrical conducting means terminating on said inner conductive films and said outer conductive films respectively for transferring electrical energy to or from said conductive films, a rigid cylindrical support member, an annulus of elastic rubber, the outside perimeter of said annulus being secured to the inside surface of said support member and the inside perimeter of said annulus being secured to the outside perimeters of the bases of said cones, a screen substantially transparent to compressional waves terminating each end of said cylindrical member and spaced from said cones and said weights for affording mechanical protection to said transducer.

9. An electromechanical transducer comprising in combination a hollow substantially rigid nonconductive cone having inner and outer conical surfaces, conductive films contacting and covering said inner and outer surfaces respectively and spaced apart at the base of said cone, said cone being of a material of the type wherein strain in the altitude and circumferential dimensions of the cone is accompanied by voltage change between said conductive films and wherein changes in voltage between said conductive films is accompanied by corresponding strain in the altitude and circumferential dimensions of said cone tending to set up compressional waves in the surrounding medium, said conductive films being free of any covering likely to materially damp mechanical energy, and means secured to the base of said cone for opposing lateral tilting of said cone relative thereto and axial movement of the base of said cone relative thereto to a substantially greater degree than circumferential and radial strain at the base of said cone when compressional wave energy is intercepted by said cone or when electrical energy is applied to said cone by way of said conductive films, said means being operable for maintaining the inwardly directed surface of said inner conductive film free of contact and abutting engagement with any liquid state or solid state obstacle.

10. An electromechanical transducer as defined in claim 9, wherein said means comprises a cone and conductive films substantially identical to the first-recited combination of said cone and said conductive films, said cones being secured and sealed base-to-base in axial alignment defining a sealed-in chamber therebetween.

11. An electromechanical transducer as defined in claim 10 further including a rigid hollow cylindrical support member, an annulus of resilient rubber, the outside perimeter of said annulus being secured to the inside surface of said support member and the inside perimeter of said annulus being secured to the outside perimeters of said bases of said cones, a screen substantially transparent to compressional waves terminating each end of said cylindrical member and spaced from said cones for affording mechanical protection to said cones.

References Cited in the file of this patent

FOREIGN PATENTS 118,239    Sweden _____ Feb. 25, 1947